United States Patent [19]

Onoe et al.

[11] Patent Number: 5,136,775
[45] Date of Patent: Aug. 11, 1992

[54] METHOD OF MANUFACTURING A MAGNETIC HEAD HAVING WEAR RESISTING FILMS

[75] Inventors: Atsushi Onoe; Kazuhiko Sato, both of Saitama, Japan

[73] Assignee: Pioneer Electronic Corporation, Tokyo, Japan

[21] Appl. No.: 725,240

[22] Filed: Jun. 27, 1991

Related U.S. Application Data

[62] Division of Ser. No. 372,600, Jun. 28, 1989, abandoned.

[30] Foreign Application Priority Data

Jan. 19, 1989 [JP] Japan .................. 1-8662

[51] Int. Cl.⁵ .............................................. G11B 5/42
[52] U.S. Cl. ....................................... 29/603; 360/122
[58] Field of Search ............... 29/603; 360/119–121, 360/122

[56] References Cited

U.S. PATENT DOCUMENTS

| | | | |
|---|---|---|---|
| 3,665,436 | 5/1972 | Murray et al. | 360/122 |
| 4,418,473 | 12/1983 | Burkhart et al. | 360/122 |
| 4,697,217 | 9/1987 | Matsuura et al. | 360/125 |
| 4,819,113 | 4/1989 | Kubota et al. | 360/122 X |
| 4,969,253 | 11/1990 | Ota et al. | 29/603 |

FOREIGN PATENT DOCUMENTS

| | | | |
|---|---|---|---|
| 0160320 | 12/1980 | Japan | 360/122 |
| 0083869 | 7/1981 | Japan | 360/122 |
| 0224114 | 10/1986 | Japan | 360/122 |
| 0039613 | 2/1989 | Japan | 360/122 |

Primary Examiner—Carl E. Hall
Attorney, Agent, or Firm—Sughrue, Mion, Zinn, Macpeak & Seas

[57] ABSTRACT

In a magnetic head comprising a magnetic core formed by joining core halves of metal magnetic material, wear-resistant films are formed on both sides of the magnetic core in such a manner that they are located at both ends of the operating gaps in the tape slide surface of the magnetic head, with non-magnetic films arranged between the magnetic core and the wear-resistant films, whereby the magnetic head is high in wear resistance and can be manufactured with high efficiency.

8 Claims, 3 Drawing Sheets

METHOD OF MANUFACTURING A MAGNETIC HEAD HAVING WEAR RESISTING FILMS

This is a divisional of application Ser. No. 07/372,600 filed Jun. 28, 1989, now abandoned.

BACKGROUND OF THE INVENTION

This invention relates to a magnetic head for use in a data recording and reproducing device such as a video tape recorder or digital audio tape recorder, which devices use a rotary type head. More particularly, the invention relates to a rotary magnetic head which is wear-resistant and is used for high-density magnetic recording.

Magnetic tapes for data recording and reproducing devices, such as video tape recorders or digital audio tap recorders performing high-density magnetic recording operations, generally use iron oxide as the recording media; however, metal recording media has been extensively employed in order to increase the recording density.

In order to record data on such recording media with high accuracy, the magnetic head core material must have a high saturation magnetic flux density. Recently, to meet this requirement, a metal magnetic material high in saturation magnetic flux density, e.g., "Sendust" (trade mark), has been used instead of a ferrite.

However, the metal magnetic material described above has a lower wear-resistance than ferrite has. In order to overcome this problem, a magnetic head made of the metal magnetic material has been devised in various ways, for instance, as shown in FIGS. 9 and 10. More specifically, in a magnetic head having a magnetic core made of the metal magnetic material high in saturation magnetic flux density, as shown in FIG. 9, wear-resistant materials 1 are bonded to both sides of a head tip 7 in such a manner that they are perpendicular to an operating gap 2 in the tape slide surface of the head tip: or as shown in FIG. 10, wear-resistant films 8 are formed on both sides of the head tip 7 by vacuum deposition or sputtering, to increase the wear resistance of the magnetic core 6.

In the case of the head tip shown in FIG. 9, the magnetic core 6 is sandwiched between the wear-resistant materials 1, and the former is bonded to the latter, for example, with an adhesive. In this case, the wear-resistant materials 1 are arranged on both sides of the magnetic core 6 in such a manner as to define the tape slide surface of the head tip 7, thus increasing the wear resistance of the magnetic head.

In the case of the head tip shown in FIG. 10, the wear-resistant films 8 are formed on both sides of the magnetic core 6 by vacuum deposition or sputtering. In this case also, the wear-resistant films are arranged on both sides of the magnetic core 6 in such a manner as to define the tape slide surface of the head tip 7, thus increasing the wear resistance of the magnetic head.

In FIGS. 9 and 10, reference numeral 3 designates a winding window or core opening formed in the magnetic core; 4, winding grooves; and 5, glass used to set a track width and to join core blocks to form the magnetic core 6.

In the case of the magnetic head shown in FIG. 9, for the purpose of increasing the wear resistance, the step of sandwiching the magnetic core between the wear-resistant materials 1 is additionally included in the manufacturing procedure, with the result that the manufacturing cost is high. In the case of the magnetic head shown in FIG. 10, it is necessary to form the wear-resistant films on both sides of each of the head tips, thereby lowering the efficiency of production and increasing manufacturing costs. Furthermore, since the wear-resistant films are formed directly on the sides of the magnetic core, the adhesion of the films to the core is not sufficiently strong.

Also, in the case where the wear-resistant layer is formed by sputtering, the core block is exposed to plasma at a high temperature for a long period of time in order to form the relatively thick (i.e., 1 $\mu$m) wear-resistant layer. As a result, a part of the wear-resistant layer may diffuse into the core block thereby producing a degenerative layer having deteriorated magnetic characteristics.

SUMMARY OF THE INVENTION

Accordingly, an object of this invention is to eliminate the above-described difficulties.

More specifically, an object of the invention is to provide a magnetic head which is high in wear resistance and high in reliability, and can be manufactured efficiently.

The foregoing object and other objects of the invention have been achieved by the provision of a magnetic head comprising a magnetic core which is formed by joining a pair of core halves of metal magnetic material, which, according to the invention, comprises: wear-resistant films formed on both sides of the magnetic core in such a manner that they are located at both ends of the operating gap in the tape slide surface of the magnetic head; and non-magnetic films arranged between the magnetic core and the wear-resistant films.

The novel features which are considered characteristic of the invention are set forth with particularly in the appended claims. The invention and additional objects and advantages thereof will best be understood from the following detailed description when read in conjunction with the accompanying drawings.

DETAILED DESCRIPTION OF THE INVENTION

One example of a magnetic head according to the invention will be described with reference to FIGS. 1 through 8.

Figure 1:
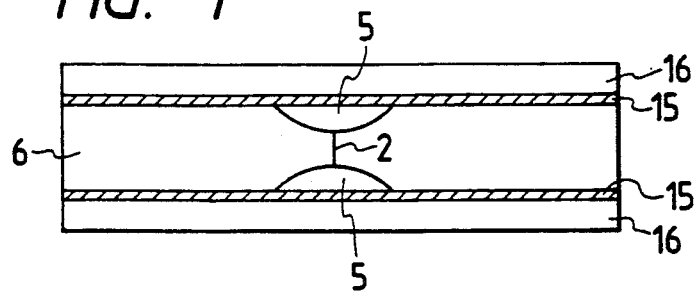
FIG. 1 is a front view showing essential components of one example of a magnetic head according to this invention.
Figure 9:
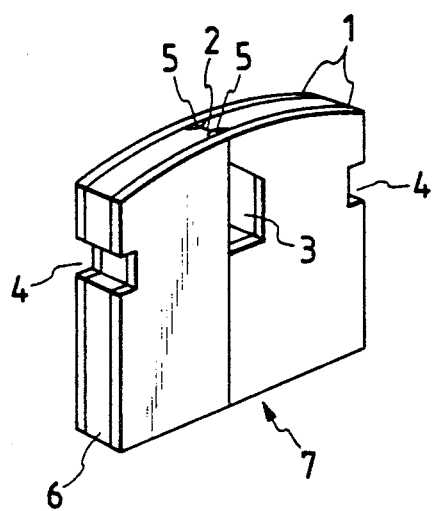
FIGS. 9 and 10 are perspective views showing examples of a conventional magnetic head.
Figure 10:
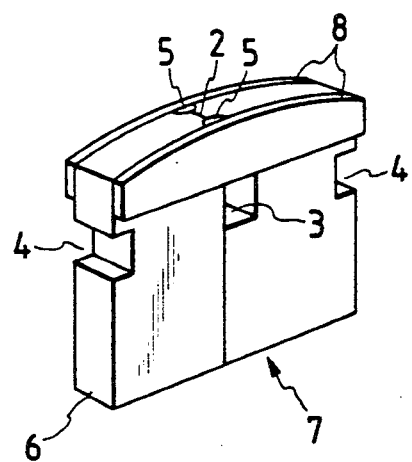

As shown in FIG. 1, the magnetic head of the invention has the same fundamental construction as the conventional head described with reference to FIGS. 9 and 10; however, it should be noted that, in the magnetic head of the invention, wear-resistant films 16 and 16 are formed on both sides of a magnetic core 6 in such a manner as to sandwich an operating gap 2 in the tape slide surface therebetween, and non-magnetic films 15 are arranged between the magnetic core 6 and the wear-resistant films 16. Glass 5 is formed in grooves machined at both ends of the operating gap 2 by a process of melting a glass rod. The grooves are shown at 11 in FIGS. 2 and 3.

The non-magnetic films 15 on both sides of the magnetic core 6 are of a very hard non-magnetic material, such as chromium Cr, titanium Ti or silicon Si, and they are formed by a film forming method such as sputtering, vacuum deposition or ion plating. The thickness of films 15 is preferably at least 50 Å. The nonmagnetic film 15 acts as a ground layer to securely form the wear-resistant layer 16. That is, the material for the layer 15 has a strong adhesion to the metal magnetic core 6, the glass 5, and the wear-resistant layer 16. It further prevents the formation of a degenerative layer in the core material when the wear-resistant layer is formed by sputtering at high temperature.

The wear-resisting films 16 on the non-magnetic films 15 are of a wear-resisting material such as $SiO_2$, $Al_2O_3$ or TiN, and they are formed by the same film forming method such as sputtering, vacuum deposition or ion plating. It is preferable that the thickness of films 16 is at least 1 $\mu$.

Figure 2:
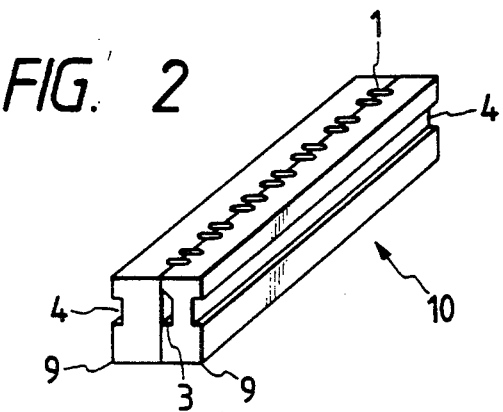
FIGS. 2 through 7 are perspective views for a description of a method of manufacturing the magnetic head according to the invention.
Figure 3:
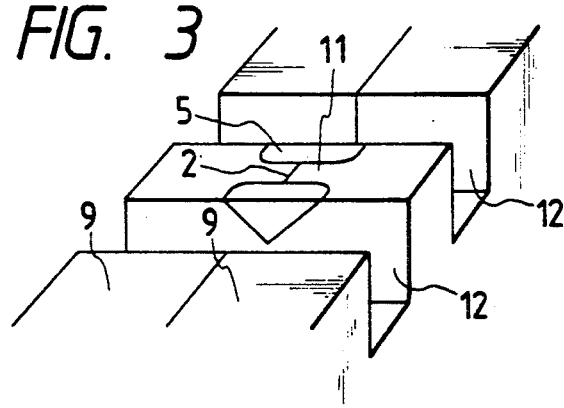

A method of manufacturing the magnetic head shown in FIG. 1 will be described. As shown in FIG. 2. a pair of core halves 9 are made of a metal magnetic material in such a manner that one of the core halves 9 has a winding groove 4 and the other has a winding window 3 in addition to a winding groove 4, and the core halves thus formed are joined together with the winding window 3 held inside to provide a core block 10. The core block 10 thus formed has a track machining grooves 11. After the two core halves 9 are joined together with the winding window 3, the core block 10 is turned so as to be placed with the tape slide surface down. A glass bar is then inserted into the winding window 3. Under this condition, the core block 10 is heated in a fireplace so that the glass is so melted as to be filled in the groove 11. In such a way, the glass 5 is formed. Thereafter, as shown in FIG. 3, grooves 12 having a predetermined width and a predetermined depth are formed in the surface of the core block 10, where tape slide surfaces are to be formed, in such a manner that any two adjacent grooves 12 define one tape slide surface including the operating gap 2. The core block 10 may be polished before forming the grooves 12.

Figure 4:
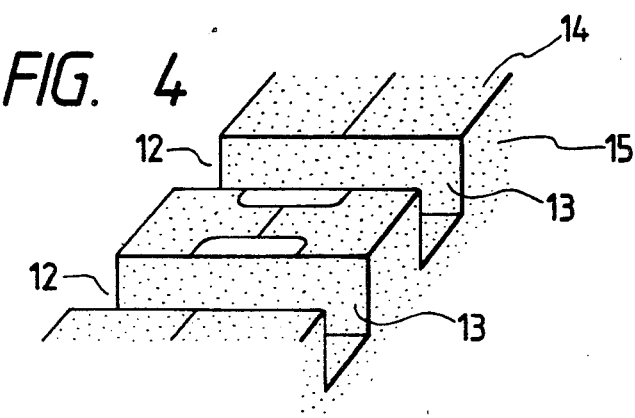
Figure 5:
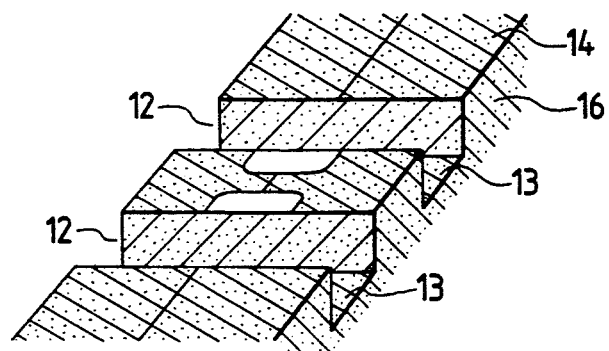
Figure 6:
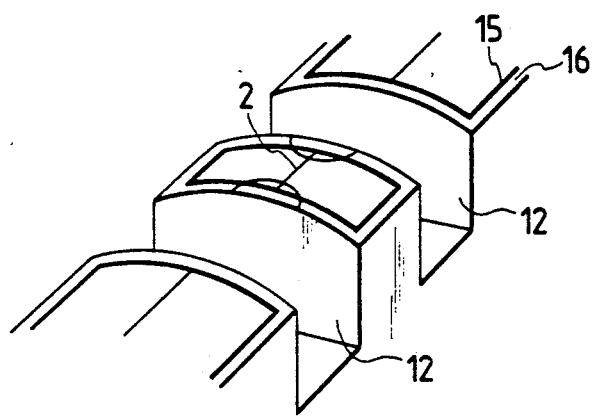

A non-magnetic film 15 is formed on the tape slide surfaces 14 and side surfaces 13 of the core block 10 by a suitable film forming method as shown in FIG. 4. Thereafter, similarly, a wear-resistant film 16 is formed on the non-magnetic film 15 of the core block 10 by a suitable film forming method as shown in FIG. 5. The tape slide surfaces of the core block 10 are then polished with a polishing cylinder, as a result of which the core block 10 is as shown in FIG. 6 where the core material is exposed on the tape slide surface and is surrounded by the non-magnetic film and the wear-resistant film.

Figure 7:
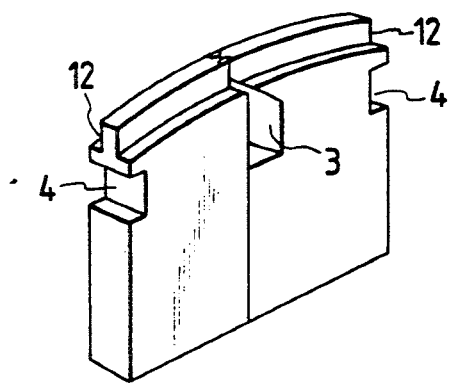

The core block 10 is sliced to a predetermined thickness, so that a head tip as shown in FIG. 7 is obtained. As can be seen, the lines of slicing are within grooves 12.

In the magnetic head of the invention thus formed, the wear-resistant films 16 are provided on both sides of the tape slide surface. Therefore, when the magnetic tape is run over the tape slide surface, the magnetic core is much higher in wear resistance than that which is made of a metal magnetic material only.

Furthermore, in the magnetic head of the invention, the non-magnetic film 15 is formed on the magnetic core of metal magnetic material as was described above. Therefore, in the case where the wear-resistant film 16 is formed to a thickness of at least 1 $\mu$, the non-magnetic film 15 thus formed acts as a protective film for the magnetic core, and accordingly the metal magnetic material thereof is not affected at all; that is, deterioration of the metal magnetic material can be prevented.

In forming the wear-resistant film 16 over the magnetic core of metal magnetic material by the film forming means, because of the provision of the non-magnetic film 15, the film forming conditions such as temperature and film forming speed are tolerable. This fact is advantageous in manufacture of the magnetic head.

On the other hand, thermal stress may be caused by the difference in thermal expansion coefficient between the metal magnetic material and the wear-resistant film 16. However, since the non-magnetic film 15 acts as a buffer, the wear-resistant film can be stably formed to some thickness, and the metal magnetic material is maintained unchanged in magnetic characteristic.

Figure 8:
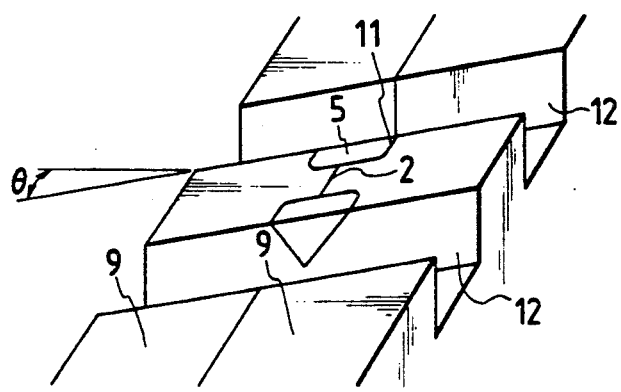
FIG. 8 is a perspective view showing one modification of the magnetic head according to the invention.

FIG. 8 shows one modification of the magnetic head described above. In the modification, the operating gap 2 is formed at an azimuth angle $\theta$ with respect to the side edges of the core block. This is to form a predetermined angle between the gap 2 and the tape running direction to increase recording density, as is known in the art. The slide-surface forming grooves 12 are formed in the magnetic core according to the azimuth angle. That is, the grooves 12 are cut in the core block 10 shown in FIG. 2. In this case, the core block may be polished with a polishing cylinder before the cutting of the grooves 12 therein. In this case, after the nonmagnetic film 15 and wear-resistant film 16 are formed, it is necessary to finish the magnetic head by polishing it with a polishing cylinder.

As was described above, in the magnetic head of the invention, after the non-magnetic film is formed on the magnetic core of metal magnetic material, the wear-resistant film is formed thereon. The wear-resistant film thus formed is improved in the strength of adhesion, and it does not adversely affect the magnetic characteristic of the magnetic core. Thus, the magnetic head can be manufactured with high efficiency.

Accordingly, the magnetic head with the magnetic core of metal magnetic material greatly increased in wear resistance can be manufactured at low cost according to the invention.

While there has been described in connection with the preferred embodiment of this invention, it will be obvious to those skilled in the art that various changes and modifications may be made therein without departing from the invention, and it is aimed, therefore, to cover in the appended claims all such changes and modification as fall within the true spirit and scope of the invention.

What is claimed is:

1. A method of manufacturing a magnetic head comprising:
   (a) joining two half core blocks of magnetic core material to form a core block having a winding window passing therethrough in a lengthwise direction, a lengthwise tape sliding surface, a pair of lengthwise side surfaces and a lengthwise operational gap reaching the lengthwise tape sliding surface;

(b) cutting a plurality of grooves in said lengthwise tape sliding surface transverse to said lengthwise direction, said grooves each having opposing side surfaces of a predetermined depth and a bottom surface of a predetermined width and being spaced apart, such that individual tape sliding surfaces are formed between adjacent grooves;

(c) depositing a hard non-magnetic material on the opposing side surfaces and the bottom surface of each of the grooves, the individual tape sliding surfaces, and the pair of lengthwise side surfaces of said core block to form a film of a hard non-magnetic material;

(d) depositing a wear-resistant material on the non-magnetic film covered surfaces of said core block to form a film of wear-resistant material;

(e) polishing said individual tape sliding surfaces to expose the magnetic core material thereat, such that the core material is surrounded by the film of hard non-magnetic material and the film of wear-resistant material; and (f) slicing said core block transversely to said lengthwise direction within each of said grooves to form individual magnetic heads.

2. The method of claim 1, wherein said hard non-magnetic material is selected from the group consisting of Cr, Ti and Si and said wear-resistant material is selected from the group consisting of $SiO_2$, $Al_2O_3$ and TiN.

3. The method of claim 1, wherein the step of depositing a hard non-magnetic material comprises depositing said material by sputtering.

4. The method of claim 1, wherein the step of depositing a hard non-magnetic material comprises depositing said material by vacuum deposition.

5. The method of claim 1, wherein the step of depositing a hard non-magnetic material comprises depositing said material by ion plating.

6. The method of claim 1, wherein the step of depositing a wear-resistant material comprises depositing said material by sputtering.

7. The method of claim 1, wherein the step of depositing a wear-resistant material comprises depositing said material by vacuum deposition.

8. The method of claim 1 wherein the step of depositing a wear-resistant material comprises depositing said material by ion plating.

* * * * *